United States Patent

Ogura

(10) Patent No.: US 9,420,161 B2
(45) Date of Patent: Aug. 16, 2016

(54) IMAGE-CAPTURING APPARATUS

(71) Applicant: Panasonic Intellectual Property Management Co., Ltd., Osaka (JP)

(72) Inventor: Motonori Ogura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/518,022

(22) Filed: Oct. 20, 2014

(65) Prior Publication Data

US 2015/0281554 A1 Oct. 1, 2015

(30) Foreign Application Priority Data

Mar. 28, 2014 (JP) ................................ 2014-068190
Sep. 22, 2014 (JP) ................................ 2014-192119

(51) Int. Cl.
*H04N 5/222* (2006.01)
*H04N 5/232* (2006.01)

(52) U.S. Cl.
CPC ....... *H04N 5/23212* (2013.01); *H04N 5/23293* (2013.01)

(58) Field of Classification Search
USPC .................................................. 348/333.11
See application file for complete search history.

(56) References Cited

U.S. PATENT DOCUMENTS

| 5,649,239 A * | 7/1997 | Tamekuni | ................ G02B 7/28 396/104 |
| 2008/0122939 A1* | 5/2008 | Hirai | .................. H04N 5/23212 348/222.1 |
| 2011/0249150 A1 | 10/2011 | Shintani et al. | |

FOREIGN PATENT DOCUMENTS

| JP | 2010-177741 | 8/2010 |
| JP | 2011-015163 | 1/2011 |
| JP | 2011-221284 | 11/2011 |
| JP | 2012-042728 | 3/2012 |

* cited by examiner

*Primary Examiner* — Roberto Velez
*Assistant Examiner* — Stephen Coleman
(74) *Attorney, Agent, or Firm* — Wenderoth, Lind & Ponack, L.L.P.

(57) ABSTRACT

An image-capturing apparatus is configured to capture an image of an object, an object. The image-capturing apparatus includes a focus lens, an image sensor configured to capture an object image of the object to produce image data, and a controller. The controller is operable to detect a speed at which the image-capturing apparatus is panned, and determine, in response to the detected speed, a control amount corresponding to a moving speed at which the controller moves the focus lens until causing the focus lens to focusing on a target object.

6 Claims, 9 Drawing Sheets

IMAGE-CAPTURING APPARATUS

TECHNICAL FIELD

The present invention relates to an image-capturing apparatus.

BACKGROUND ART

Japanese Patent Laid-Open Publication No. 2011-15163 discloses an image-capturing apparatus that employs a system of depth From Defocus (DFD) method. This image-capturing apparatus implements a focus control that obtains plural defocusing, and includes an image-capturing device for capturing plural images defocusing differently from each other. The image-capturing apparatus then determine an object distance based on the plural images defocusing differently from each other. The image-capturing apparatus performs the focus control based on the determined object distance.

SUMMARY

An image-capturing apparatus is configured to capture an image of an object, an object. The image-capturing apparatus includes a focus lens, an image sensor configured to capture an object image of the object to produce image data, and a controller. The controller is operable to detect a speed at which the image-capturing apparatus is panned, and determine, in response to the detected speed, a control amount corresponding to a moving speed at which the controller moves the focus lens until causing the focus lens to focusing on a target object.

The image-capturing apparatus performs a convenient focusing operation.

DETAIL DESCRIPTION OF PREFERRED EMBODIMENT

An exemplary embodiment of the present invention will be detailed below with reference to the accompanying drawings. An excessive description is omitted. For instance, a description of a well-known subject in a public domain is omitted, or a description of a similar element to that discussed previously is omitted for avoiding redundancy and facilitating an ordinary skilled person in the art to understand the present invention.

The inventor(s) provides the accompanying drawings and the description for the ordinary skilled person in the art to fully understand the disclosure, so that these materials may not limit the scope of the claims.

A number of methods for measuring an object distance, a distance from an image-capturing apparatus to an object includes a depth from Defocus (DFD) method that utilizes correlation values of defocusing amounts generated in image captured with a camera. In general, a defocusing amount is uniquely determined for each image-capturing apparatus in response to a relation between a focal position and the object distance. In the DFD method utilizing the above characteristics, two images having different defocus amounts are produced, and the object distance is measured based on a point-spread function (PSF) and a difference in the defocusing amounts. The image-capturing apparatus in accordance with this embodiment measures the object distance by utilizing the DFD calculation to perform an auto-focus control.

A structure and operation of the image-capturing apparatus in accordance with the embodiment will be described below.

1. Electrical Structure of Image-Capturing Apparatus

Figure 1:
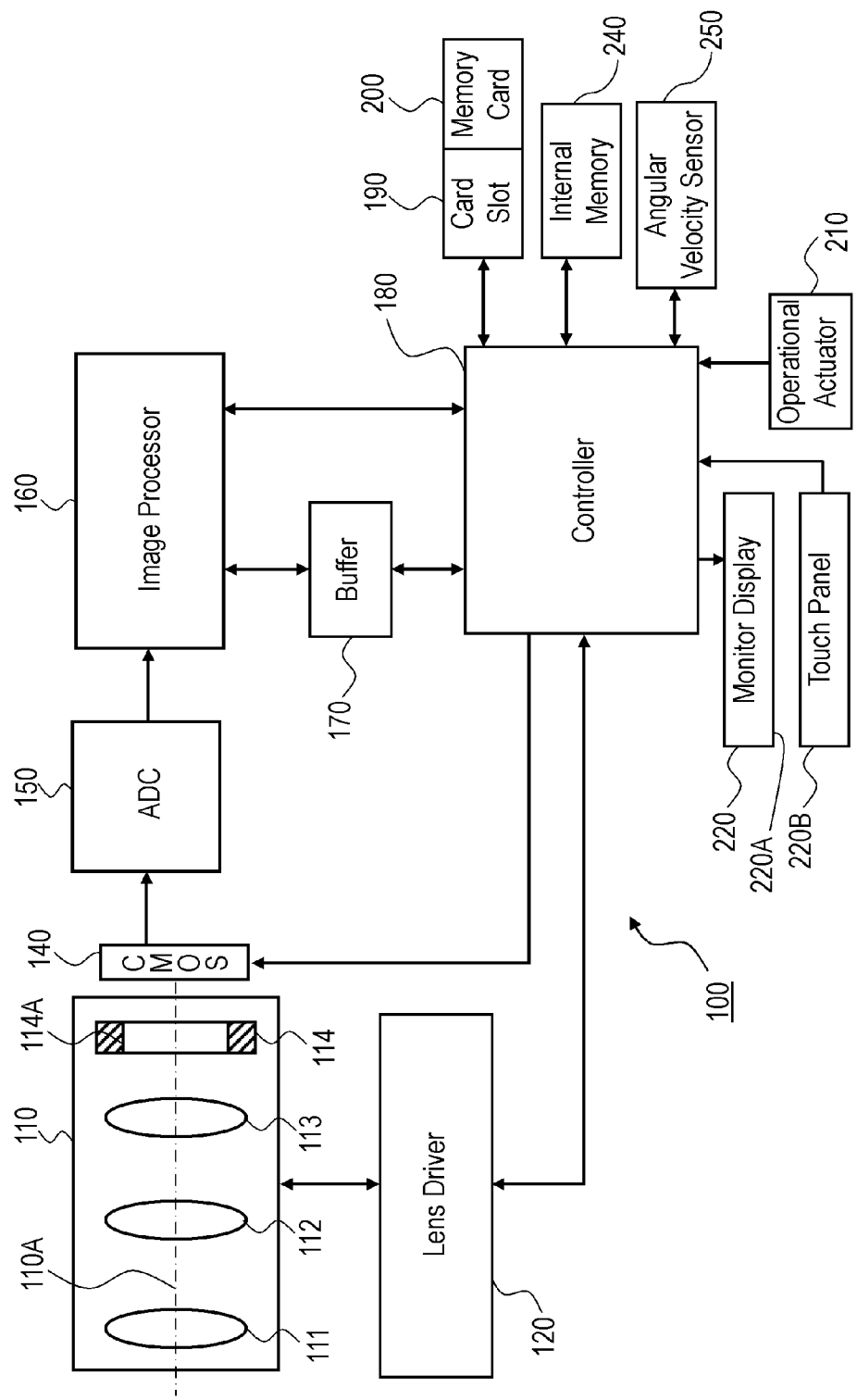
FIG. 1 is a block diagram of a digital video camera in accordance with an exemplary embodiment for illustrating an electrical structure of the digital video camera.

FIG. 1 is a block diagram of digital video camera 100, an image-capturing apparatus in accordance with the embodiment, for illustrating an electrical structure of digital video camera 100. Digital video camera 100 includes optical system 110 including at least one lens. Optical system 110 forms an object image on CMOS image sensor 140 by utilizing light from an object. The object image is captured with an image sensor, CMOS image sensor 140. CMOS image sensor 140 produces image data based on the captured object image. The image data produced by CMOS image sensor 140 is converted into a digital signal with ADC 150, and processed with image processor 160. The digital signal is stored in memory card 200. The structure of digital video camera 100 will be detailed below.

Optical system 110 in accordance with the embodiment includes zoom lens 111, camera-shake correcting lens 112, focus lens 113, and iris 114. Zoom lens 111 moves along optical axis 110A to enlarge and reduce the object image. Focus lens 113 moves along optical axis 110A to adjust a focus of the object image. Camera-shake correcting lens 112 is movable within a plane perpendicular to optical axis 110A of optical system 110. Camera-shake correcting lens 112 moves along a direction in which a shake of digital video camera 100 is cancelled as to reduce an influence caused by the shake of camera 100 on the captured image. Iris 114 has opening 114A therein disposed on optical axis 110A, and adjusts the size of opening 114A automatically or according to a user's setting, so that iris 114 can adjust an amount of light transmitting through iris 114.

Lens driver 120 includes a zoom actuator that drives zoom lens 111, a camera-shake correcting actuator that drives camera-shake correcting lens 112, a focus actuator that drives focus lens 113, and an iris actuator that drives iris 114. Lens driver 120 controls the zoom actuator, the camera-shake correcting actuator, the focus actuator, and the iris actuator.

CMOS image sensor 140 captures the object image formed by optical system 110, and produces analog image data in form of an analog signal. Image sensor 140 performs various operations, such as exposure, transfer, and electronic shutter.

A/D converter 150 converts the analog image data produced by CMOS image sensor 140 into digital image data in form of a digital signal.

Image processor 160 processes the image data produced by CMOS image sensor 140 to produce image data to be displayed on monitor display 220 and to produce image data to be stored in memory card 200. For instance, image processor 160 performs a gamma correction, a white-balance correction, and a flaw correction on the image data produced by CMOS image sensor 140. Image processor 160 compresses the image data produced by CMOS image sensor 140 by a compression method in accordance with H.264 standard or MPEG2 standard. Image processor 160 may be implemented by a DSP or a microprocessor.

Controller 180 controls entire digital video camera 100, and can be implemented by a semiconductor element. Controller 180 can be implemented by hardware, or by a combination of hardware and software. Controlled may be implemented by a microprocessor.

Buffer 170 functions as a working memory of image processor 160 and controller 180, and can be implemented by, e.g. a DRAM or a ferroelectric memory.

Card slot 190 holds memory card 200 detachably, and is mechanically or electrically connectable to memory card 200. Memory card 200 contains a flash memory or a ferroelectric memory therein, and stores data, such as an image file produced in image processor 160.

Internal memory 240 is implemented by a flash memory or a ferroelectric memory, and stores a control program that controls entire digital video camera 100. Internal memory 240 also stores point spread functions (PSFs).

Operational actuator 210 includes user interfaces, such as a cross key, an enter-button, for accepting operations by users.

Monitor display 220 has screen 220A that displays thereon an image indicated by the image data produced by CMOS image sensor 140 and an image indicated by the image data read out from memory card 200. Monitor display 220 displays various menus for setting functions of camera 100 on screen 220A. Touch panel 220B is disposed on screen 220A. Touch panel 220B is touched by a user for receiving various touch actions. An instruction entering through touch panel 220B as a touch action is supplied to controller 180 to be processed.

Angular velocity sensor 250 detects an angular velocity produced in digital video camera 100 due to a camera shake. The angular velocity detected by sensor 250 is supplied to controller 180. Controller 180 drives camera-shake correcting lens 112 to cancel a camera shake produced in digital video camera 100 due to the angular velocity.

2. Operations of Digital Video Camera 100

2-1. Auto-Focus Operations Utilizing a Result of the DFD Calculation

Figure 2:
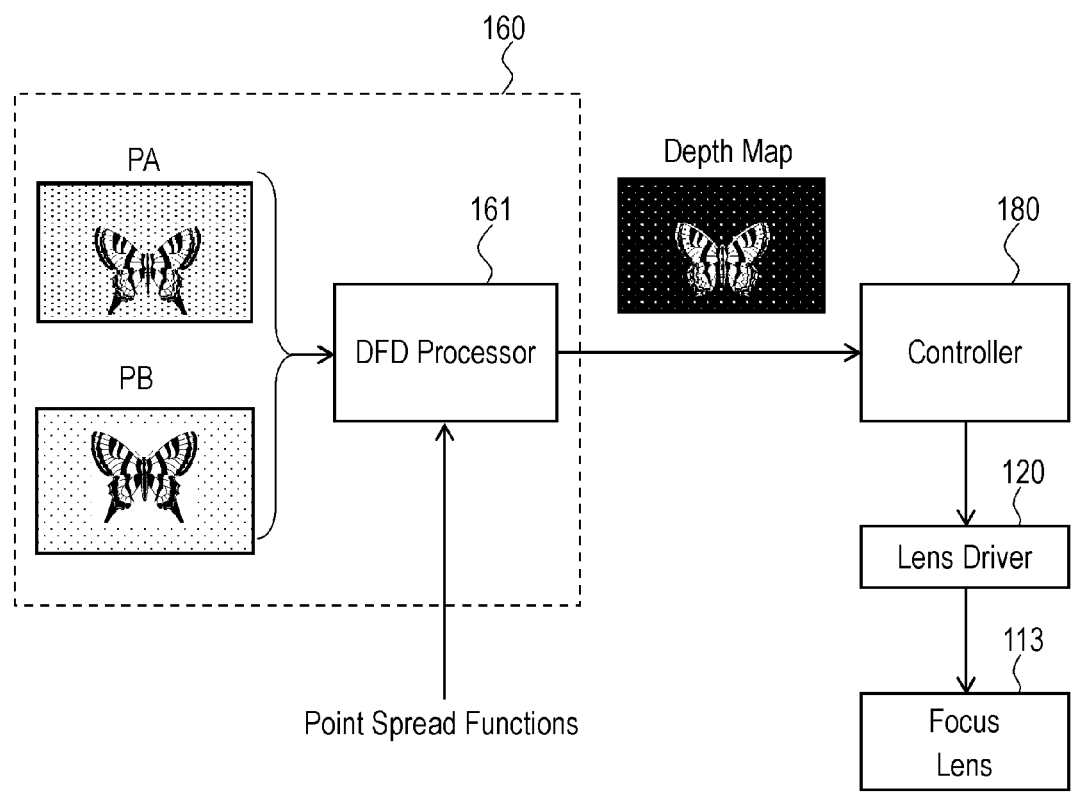
FIG. 2 is a block diagram of the digital video camera in accordance with the embodiment for illustrating an operation of the digital video camera.

Digital video camera 100 performs an auto-focus operation utilizing a result of the DFD calculation. FIG. 2 is a block diagram of digital video camera 100 for illustrating a control of the focus lens by utilizing the result of the DFD calculation.

DFD processor 161 is disposed in image processor 160, and performs the DFD calculation to produce a depth map. To be more specific, DFD processor 161 uses two images: observed image PA and reference image PB having different defocusing amounts produced intentionally by changing focal positions. DFD processor 161 produces the depth map based on observed image PA, reference image PB, and point spread functions (PSFs). The depth map indicates object distances at respective ones of pixels of observed image PA (reference image PB).

Then, DFD processor 161 supplies the depth map to controller 180. Controller 180 controls lens driver 120 as to drive focus lens 113 based on the depth map.

The DFD calculation performed by DFD processor 161 shown in FIG. 2 and the determination of the object distance by controller 180 will be detailed below.

Figure 3:
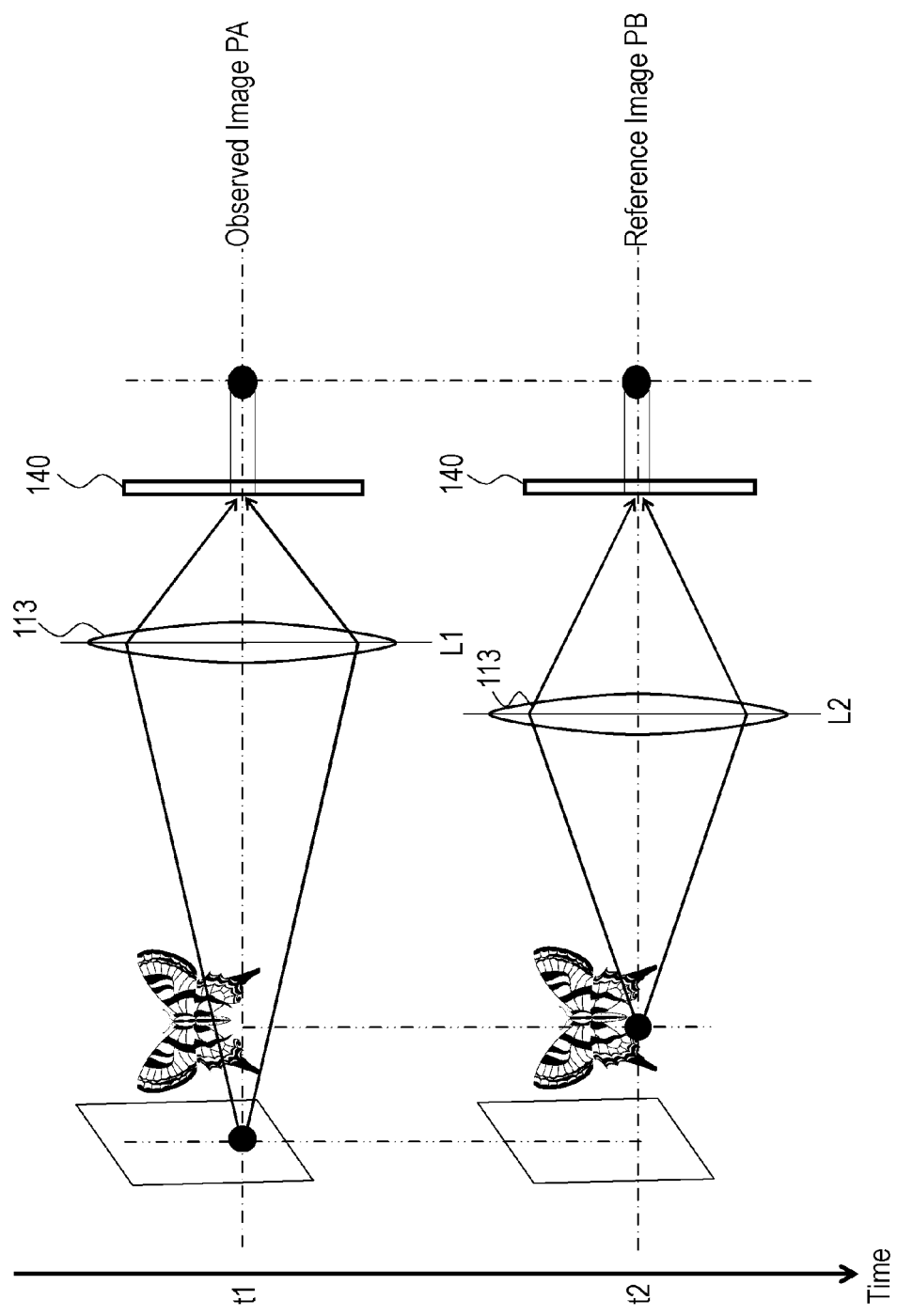
FIG. 3 is a schematic view of the operation of the digital video camera in accordance with the embodiment.

First, the DFD calculation performed by DFD processor 161 will be detailed. FIG. 3 is a schematic view of focus lens 113 of digital video camera 100 in accordance with the embodiment for illustrating the movement of focus lens 113 for the DFD calculation. Controller 180 changes a focal position based on the DFD calculation to intentionally produce two images having different defocusing amounts. To be more specific, as shown in FIG. 3, controller 180 controls lens driver 120 to locate focus lens 113 at focusing position L1 at time point t1. Similarly, focus lens 113 is located at focusing position L2 different from focusing position L1 at time point t2. CMOS image sensor 140 captures an image of the object when focus lens 113 is positioned at focusing position L1 for producing observed image PA. Similarly, image sensor 140 captures the image of the object when focus lens 113 is positioned at focusing position L2 for producing reference image PB. Although being produced by capturing the same object, images PA and PB have defocusing amounts different from each other due to different positions of focus lens 113 for the capturing.

Figure 4:
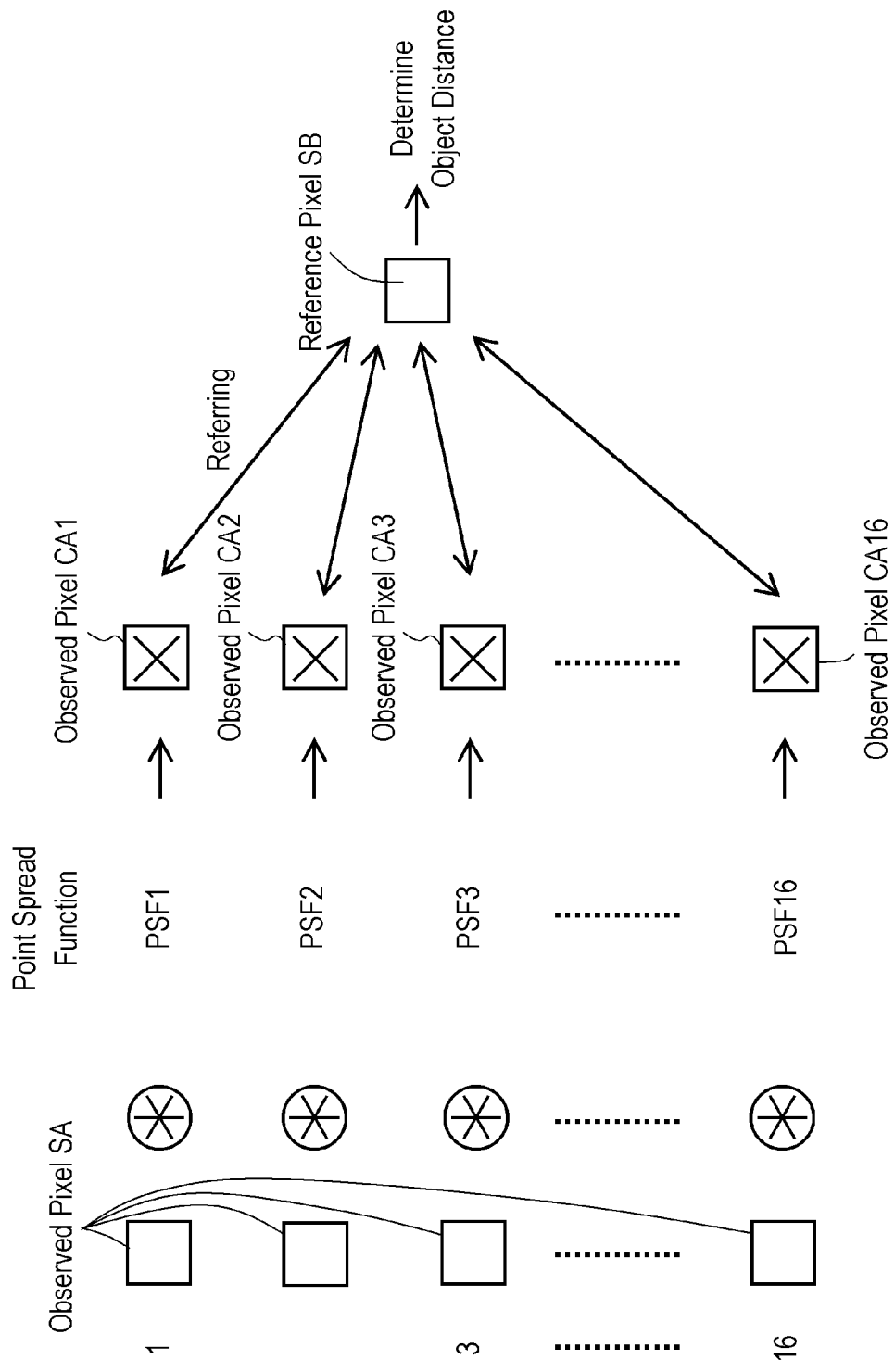
FIG. 4 is a schematic view of a DFD calculation executed by the digital video camera in accordance with the embodiment.

FIG. 4 is a schematic view for illustrating the calculation of the object distance by utilizing the DFD calculation performed by digital video camera 100 in accordance with the embodiment. DFD processor 161 performs the DFD calculation on observed pixels SA constituting observed image PA and reference pixels SB constituting reference image PB to determine the distances from respective ones of pixels SA (SB). DFD processor 161 produces plural observed pixels CA by convolutions of plural PSFs with observed pixels SA. DFD processor 161 compares plural observed pixels CA with reference pixels SB located at the same coordinates as pixels CA on the image. The above operation will be detailed below.

A point spread function (PSF) indicates a response to a point light source of an optical system, and indicates a change in a defocusing amount. A convolution of the PSF with an image corresponding to a combination of point light sources can intentionally produce a defocused image. According to the embodiment, a large number of point spread functions corresponding to a large number of distances to an object are previously provided in internal memory 240. Controller 180 separates distances to an object into sixteen steps, namely from the closest point to the farthest point, and selects sixteen point spread functions PSF1 to PSF16 corresponding to the sixteen steps out of the large number of point spread functions stored in memory 240. Controller 180 then supplies selected point spread functions PSF1 to PSF16 to DFD processor 161.

DFD processor 161 performs convolutions of point spread functions PSF1 to PSF16 with observed pixels SA as to produce sixteen observed pixels CA1 to CA16 corresponding to the object distances at respective ones of observed pixel SA. Since observed pixels CA1 to CA16 have point spread functions different from each other for convolution, observed pixels CA1 to CA16 form different defocused images.

DFD processor 161 then compares observed pixels CA1 to CA16 with reference pixel SB, and selects observed pixel CAn that has the smallest difference from reference pixel SB among observed pixels CA1 to CA16. DFD processor 161 determines the object distance corresponding to the point spread function for convolution producing observed pixel CAn as the distance to the object at observed pixel SA. For instance, if the difference between observed pixel CA3 and reference pixel SB is smaller than differences between reference pixel SB and each of other observed pixels CA1 to CA2, CA4 to CA16, then, DFD processor 161 determines that an object distance corresponding to point spread function PSF3 for convolution with observed pixel SA to produce observed pixel CA3 is the object distance at observed pixel SA. DFD processor 161 outputs distance data corresponding to the determined object distance.

DFD processor 161 performs the above operation on each observed pixels PA and reference pixels PB as to produce a depth map plotting respective object distances at the pixels. According to the embodiment, since sixteen point spread functions corresponding to distances to the object are used, the depth map exhibits sixteens levels of the object distances.

Figure 5:
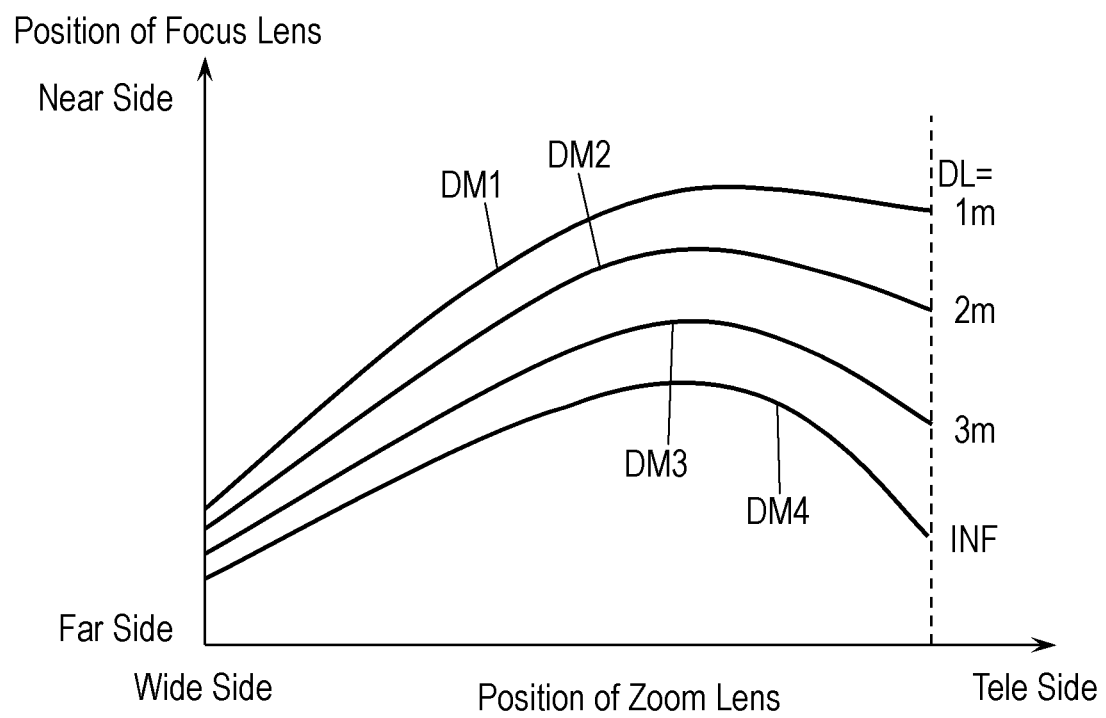
FIG. 5 is a zoom tracking table with respect to distances to plural object distances of the digital video camera in accordance with the embodiment.

Next, based on the object distance determined by the DFD calculation, controller 180 determines an in-focus position to which focus lens 113 is to move. To be more specific, controller 180 refers to a tracking table for calculating the in-focus position based on the determined object distance as well as a current position of focus lens 111. FIG. 5 is the zoom tracking table for plural object distances of digital video camera 100 in accordance with the embodiment. As shown in FIG. 5, profiles DM1 to DM4 indicate in-focus positions corresponding to a position of zoom lens 111 for typical distances DL to an object (1 m, 2 m, 3 m, and infinite shown in FIG. 5). Controller 180 can calculate in-focus positions for object distances other than the typical object distances DL by interpolation to the profiles shown in FIG. 5 with respect to the object distances.

Controller 180 determines the in-focus position based on the calculated object distance and the zoom tracking table, and controls lens controller 120 to move focus lens 113 to the in-focus position as to cause focus lens 113 to focus on the object.

2-2. Control of Focus Lens 113 in Response to Panning

Controller 180 can determine, based on an output from angular velocity sensor 250, whether or not a user pans digital video camera 100. Controller 180 can detect a panning speed by calculating the output from angular velocity sensor 250. The determination of the panning and the panning speed are not limited to the use of the output from angular velocity sensor 250. For instance, controller 180 detects a moving object in an image captured by CMOS image sensor 140 or uses another method, thereby determining whether or not camera 100 is panned, and detecting a panning speed.

Figure 6:
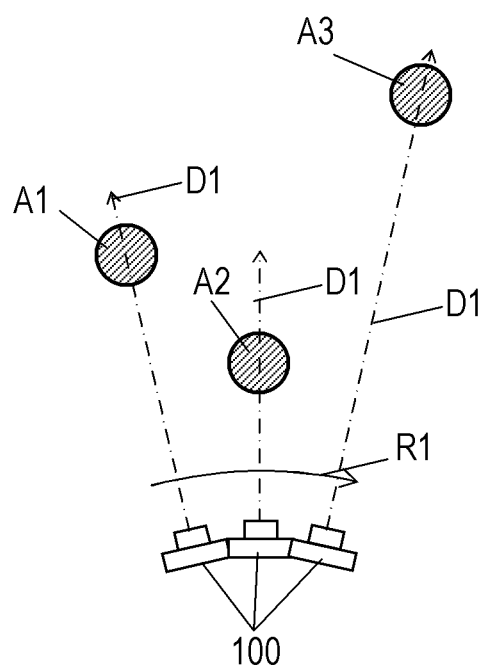
FIG. 6 is a flowchart of the operation of the digital video camera in accordance with the embodiment.
Figure 7:
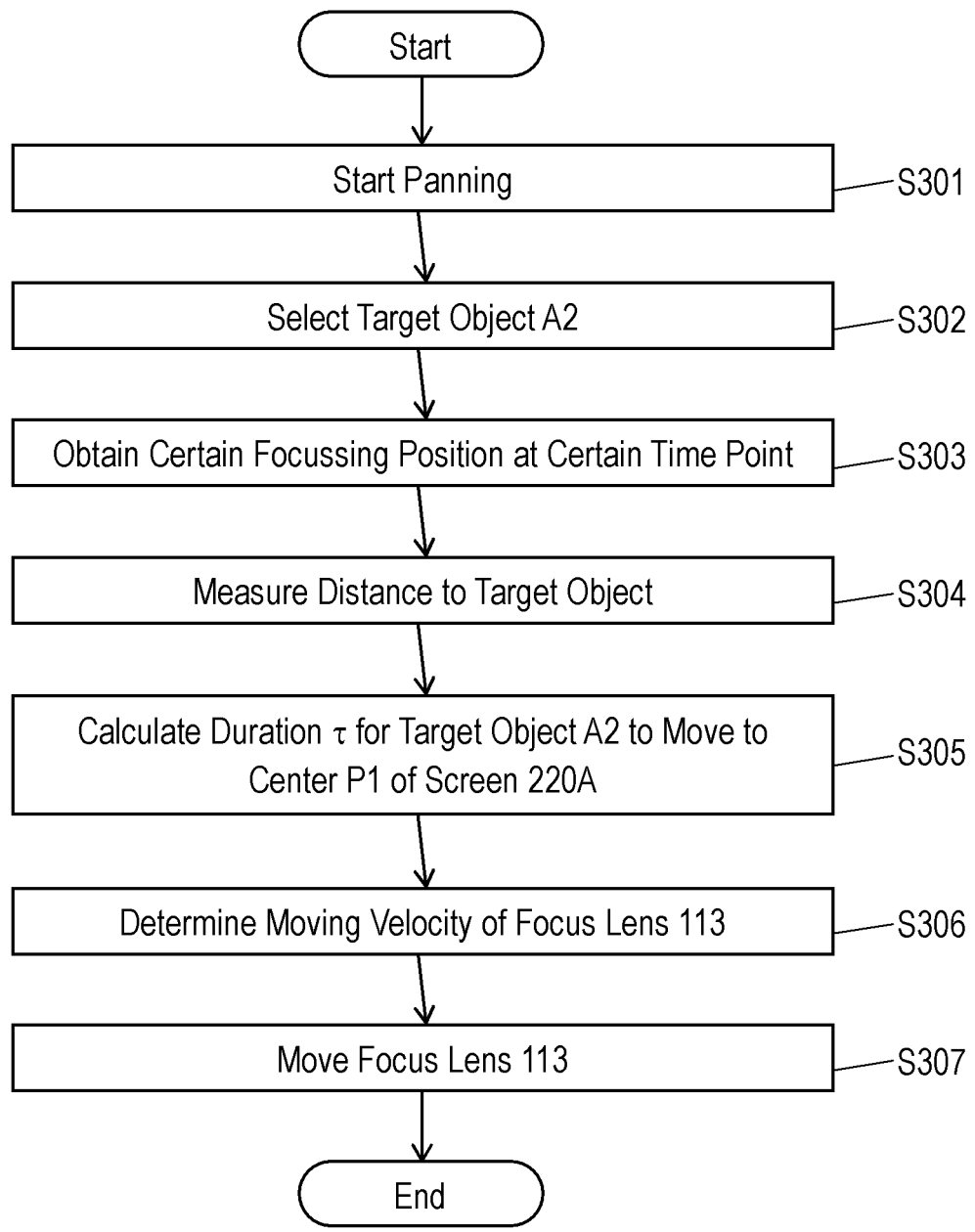
FIG. 7 is a flowchart of an operation of the digital video camera in accordance with the embodiment.
Figure 8A:
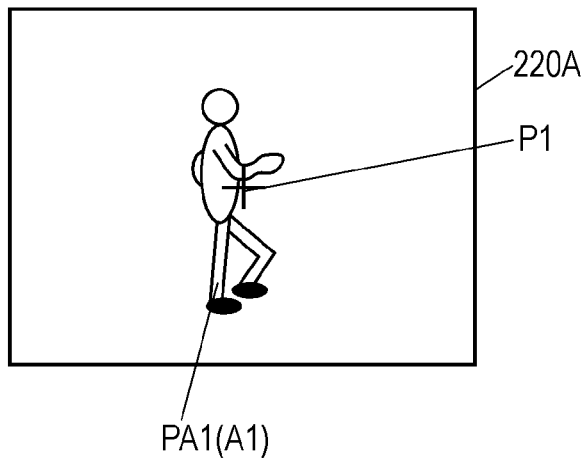
FIGS. 8A to 8C are schematic view of a screen of a display monitor of the digital video camera in accordance with the embodiment.
Figure 8B:
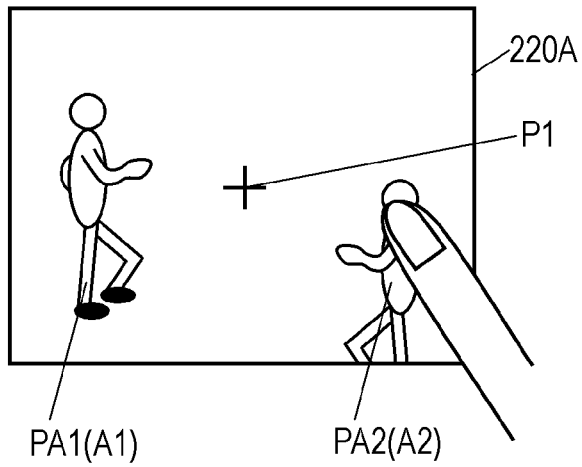
Figure 8C:
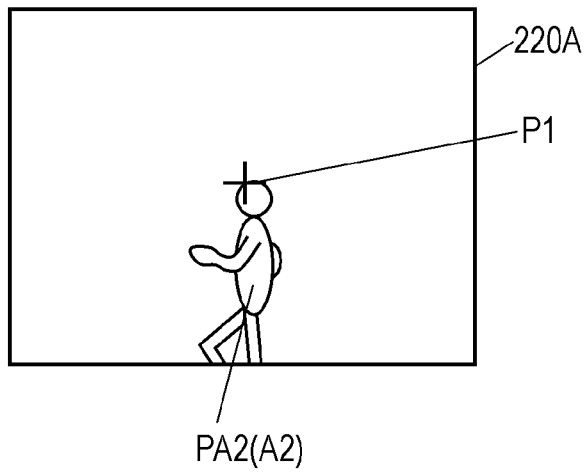

The user captures images of objects with digital video camera 100 while panning camera 100 right and left directions. FIG. 6 is a schematic view of digital video camera 100 and objects A1, A2, A3 located on image-capturing directions D1 that agree with optical axis 110A shown in FIG. 1 while being panned FIG. 7 is a flowchart of calculating a lens moving speed of focus lens 113 that follows the panning of digital video camera 100. FIGS. 8A to 8C are schematic view of screen 220A of display monitor 220 while camera 100 is panned.

As shown in FIG. 6, objects A1, A2, and A3 are located at different distances from camera 100. The user pans digital video camera 100 to right direction R1, so that a state of capturing object A1 changes to a state of capturing object A3 via a state of capturing object A3 in the frame. At this moment, digital video camera 100 controls focus lens 113 such that a focusing speed at which object A1, A2, A3 is focused on can be adjusted in accordance with the panning speed.

As shown in FIG. 7, the user starts panning camera 100 when camera is ready to capture an object (step S301). At this moment, controller 180 starts calculating the panning speed of camera 100 based on a change in the output from angular velocity sensor 250.

During the panning, the user selects target object A2, which is a focusing target, from through-images displayed on screen 220A of display monitor 220 (step S302). In screen 220A shown in FIG. 8A, object image PA1 of object A1 is captured. From this state, digital video camera 100 is panned to right direction R1, and then, object image PA2 of object A2 appears in screen 220A. At this moment, the user selects target object A2 (i.e. the focusing target) from a through-image by, for instance, operating touch-panel 220B disposed on screen 220A with a finger.

Controller 180 obtains position F1 of focus lens 113 (step S303). The position F1 is an in-focus position at a certain time point when target object A2 is selected by the user. Controller 180 then obtains an object distance from digital video camera 100 to target object A2 by the DFD calculation (step S304). Controller 180 obtains a focal distance that is determined based on a position of zoom lens 111 at the certain time point when target object A2 is selected by the user. Controller 180 then calculates a half-picture angle α (degree) in a horizontal direction by using dimension d in the horizontal direction of CMOS image sensor 140 and the obtained focal distance f by Formula 1.

$$\alpha = \tan^{-1}\frac{d}{2f} \qquad \text{(Formula 1)}$$

Figure 9:
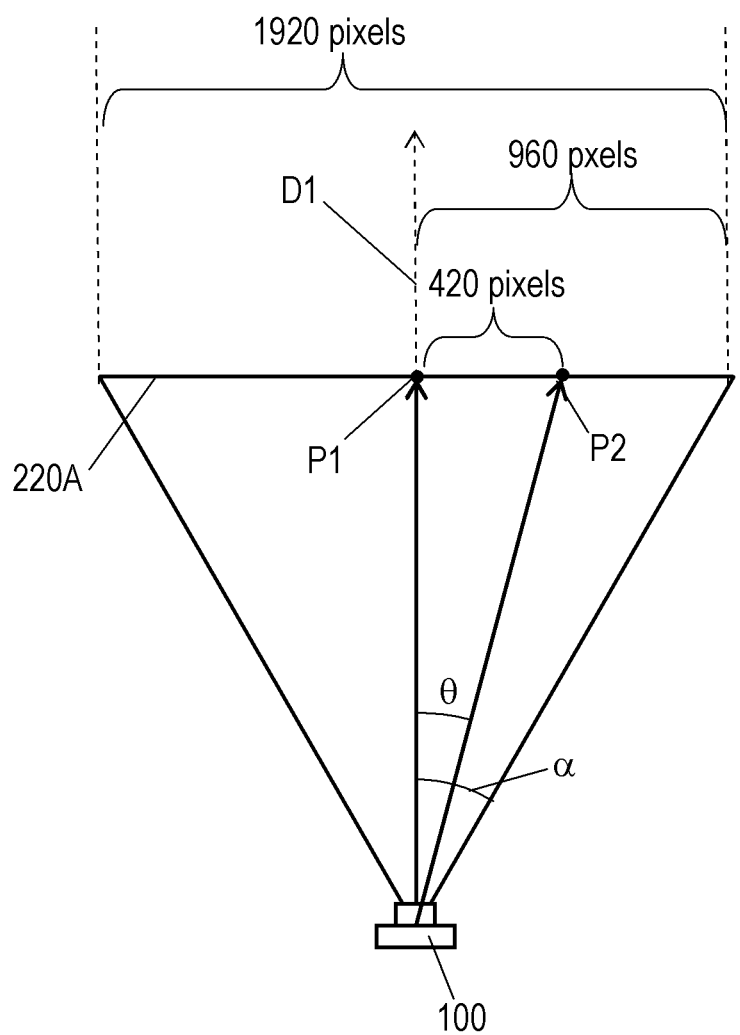
FIG. 9 is a schematic view of the digital video camera in accordance with the embodiment for illustrating an operation of calculating a lens moving speed of the digital video camera.

Controller 180 detects the position, in the horizontal direction, of the image of object A2 displayed on screen 220A. FIG. 9 shows an operation of calculating a lens moving speed of focus lens 113 in accordance with the panning. In FIG. 9, screen 220A of display monitor 220 is a form of 180 pixels in the vertical direction) by 1980 pixels in the horizontal direction. Image-capturing direction D1 of camera 100 corresponds to a predetermined position in screen 220A. According to this embodiment, the predetermined position is center P1 of screen 220A. As shown in FIG. 9, position P2, in the horizontal direction, of the image of selected object A2 on screen 220A is away from center P1 toward the right by 420 pixels in the horizontal direction. Angle θ (degree) between position P2 and center P1 is expressed by Formula 2.

$$\theta = \tan^{-1}\left(420 \times \frac{\tan\alpha}{960}\right) \qquad \text{(Formula 2)}$$

A necessary duration τ (seconds) for the image of object A2 to move to center P1 of screen 220A is calculated by using angle θ and panning speed β (deg/sec) in Formula 3.

$$\tau = \frac{\theta}{\beta} \qquad \text{(Formula 3)}$$

Controller 180 refers to the zoom tracking curve for obtaining position F2 of focus lens 113 at an object distance to object A2. Controller 180 thus can calculate, by using duration τ, a lens moving speed at which focus lens 113 moves during the panning, and positions F1 and F2 of focus lens 113 (step S306). Controller 180 moves focus lens 113 at the calculated lens moving speed at the certain time point during the panning (step S307). Object A2 is not in focus at the certain time point when the user selects target object A2; however, while the image capturing apparatus is panned to right direction R1, when target object A2 is positioned in image-capturing direction D1 from digital video camera 100 during this panning, the image of target object A2 is located at center P1 of screen 220A as shown in FIG. 8C and is focused on.

3. Advantage

As discussed above, the image capturing apparatus, i.e., digital video camera 100), in accordance with the embodiment includes focus lens 113, an image sensor, i.e., CMOS image sensor 140 that captures an object image formed through focus lens 113 for producing image data, and controller 180. Controller 180 detects a panning speed. Controller 180 determines the lens moving speed of the focus lens based on the detected panning speed. To be more specific, controller 180 determines the moving speed of focus lens 113 in response to the panning speed detected at the certain time point when object A2 is selected during the panning.

In other words, the image capturing apparatus, i.e., digital video camera 100 in accordance with this embodiment includes focus lens 113, an image sensor, i.e., CMOS image sensor 140 configured to capture an object image of the object to produce image data, and controller 180. Controller 180 is operable to detect a speed at which the image-capturing apparatus is panned. Controller 180 is operable to determine, in response to the detected speed, a control amount corresponding to a moving speed at which the controller moves the focus lens until causing the focus lens to focusing on a target object.

The control amount may be the lens moving speed of focus lens 113. In this case, controller 180 moves focus lens 113 at the lens moving speed, thereby causing focus lens 113 to focus on target object A2.

The above structure allows digital video camera 100 to focus on target object A2 in accordance with the panning speed of camera 100 panned by the user. Digital video camera 100 thus focuses on object A2 in accordance with the panning speed at which the user pans camera 100, so that camera 100 can focus on object A2 while camera 100 is panned according to a framing policy of the user. As a result, an ordinary user of digital video camera 100 can track a transition of object A2 easily like a professional cameraman practices.

Controller 180 may be operable to cause CMOS image sensor 140 to capture object image PA2 of target object A2 at a certain time point while digital video camera 100 is panned, to detect a position of object image PA2 on the screen 220A at the certain time point, to obtain a certain focusing position (position F1) of focus lens 113 at the certain time point, and to determine the control amount based on the detected position of object image PA2, the certain focusing position (position F1), and the detected speed β.

Controller 180 may be operable to cause CMOS image sensor 140 to capture object image PA2 of target object A2 at a certain time point while digital video camera 100 is panned, to detect an object distance to the target object A2 at the certain time point, to obtain a certain focusing position (position F1) of the focus lens 113 at the certain time point, and to determine the control amount based on the certain focusing position (position F1), the object distance, and the detected speed β.

Target object A2 may be selected at the certain time point by touching screen 220A.

4. Other Embodiments

In the above embodiment, an example of a technique disclosed in this patent application is described; however, the technique disclosed in this application is not limited to the above embodiment and is applicable to other embodiments with a change, replacement, supplement, or omission. The structural elements described in the embodiment can be combined for establishing a new embodiment.

An example of embodiments will be described below.

According to the above embodiment, the point spread functions are stored in internal memory 240; however, the present invention is not limited to this structure, for instance, the point spread functions may be stored in a memory of image processor 160. Digital video camera 100 in accordance with the above embodiment selects sixteen point spread functions; however, the number of the selected point spread functions may be larger than sixteen or smaller than sixteen in response to the number of levels of the depth map.

The image-capturing apparatus in accordance with the above embodiment is a digital video camera. The lens of this camera cannot be replaced; however, the camera is not limited to this structure, and the present invention is applicable to a digital video camera with a replaceable lens.

In the above embodiment, examples of the technique disclosed in the present invention are described with accompanying drawings and detailed descriptions. The structural elements in the drawings or the detailed descriptions include not only elements essential for problems to be solved but also other elements necessary for detailing the examples but not necessary for solving the problems. Although these elements not necessary for solving the problems are described here, they should not be construed as essential elements for the problems to be solved.

The above embodiments only describe examples of the technique disclosed in the present invention, so that various changes, replacements, supplements, or omissions are allowed in the scope of claims described later or an equivalent scope thereto.

The image-capturing apparatus of the present invention is applicable to digital video cameras, digital still cameras, portable-phones with camera function, or smart-phones with camera function.

What is claimed is:

1. An image-capturing apparatus configured to capture an image of an object, the image-capturing apparatus comprising:
   a focus lens;
   an image sensor configured to capture an object image of the object to produce image data; and
   a controller operable to
   (i) cause the image sensor to capture the object image of a target object at a certain time point while the image-capturing apparatus is panned;
   (ii) detect a speed at which the image-capturing apparatus is panned, and an object distance to the target object at the certain time point;
   (iii) obtain a certain focusing position of the focus lens at the certain time point using the detected object distance; and
   (iv) determine, based on the certain focusing position and the detected speed, a control amount corresponding to a moving speed at which the controller moves the focus lens such that the focus lens focuses on the target object at a time when the target object is positioned at a predetermined position.

2. The image-capturing apparatus according to claim 1, wherein the control amount is a lens moving speed at which the focus lens moves, and
wherein the controller is operable to move the focus lens at the lens moving speed to cause the focus lens to focus on the target object.

3. The image-capturing apparatus according to claim 1, wherein the image-capturing apparatus captures an image of an object in an image-capturing direction that is changed by panning the image-capturing apparatus, and
wherein the controller is operable to determine the control amount such that the focus lens focuses on the target object when the object is positioned in the image-capturing direction from the image-capturing apparatus by panning the image-capturing apparatus.

4. The image-capturing apparatus according to claim 1, wherein the object is selected at the certain time point.

5. The image-capturing apparatus according to claim 1, further comprising
a screen that displays the object image,
wherein the controller is operable to:
   detect a position of the object image on the screen at the certain time point; and
   determine a necessary duration for the target object to move from the position on the screen to the predetermined position based on the detected position of the object image and the detected speed.

6. The image-capturing apparatus according to claim 5, wherein the image-capturing apparatus captures an image of an object in an image-capturing direction that is changed by panning the image-capturing apparatus,
wherein the image-capturing direction corresponds to a predetermined position on the screen, and
wherein the controller is operable to determine the control amount such that the focus lens focuses on the target object at a time when the object image is positioned at the predetermined position on the screen by panning the image-capturing apparatus.

* * * * *